United States Patent
Acharya et al.

(10) Patent No.: US 10,210,593 B2
(45) Date of Patent: Feb. 19, 2019

(54) ADAPTIVE CONTEXT SWITCHING

(71) Applicant: QUALCOMM Incorporated, San Diego, CA (US)

(72) Inventors: Anirudh Rajendra Acharya, San Diego, CA (US); Alexei Vladimirovich Bourd, San Diego, CA (US); David Rigel Garcia Garcia, North York (CA); Milind Nilkanth Nemlekar, San Diego, CA (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/009,605

(22) Filed: Jan. 28, 2016

(65) Prior Publication Data

US 2017/0221173 A1 Aug. 3, 2017

(51) Int. Cl.
*G06T 1/20* (2006.01)
*G06F 9/48* (2006.01)

(52) U.S. Cl.
CPC .............. *G06T 1/20* (2013.01); *G06F 9/4843* (2013.01); *G06F 9/4887* (2013.01); *G06T 2200/28* (2013.01)

(58) Field of Classification Search
None
See application file for complete search history.

(56) References Cited

U.S. PATENT DOCUMENTS

| 8,310,492 | B2 | 11/2012 | McCrary et al. |
| 2007/0136730 | A1 | 6/2007 | Wilt et al. |
| 2009/0049451 | A1 | 2/2009 | Bates |
| 2013/0124838 | A1 | 5/2013 | Shah et al. |
| 2013/0132711 | A1 | 5/2013 | Shah et al. |
| 2013/0162661 | A1 | 6/2013 | Bolz et al. |
| 2014/0022263 | A1 | 1/2014 | Hartog et al. |
| 2014/0022266 | A1* | 1/2014 | Metz ..................... G06F 9/4806 345/522 |
| 2014/0184617 | A1* | 7/2014 | Palmer ..................... G06T 1/20 345/506 |
| 2015/0235308 | A1* | 8/2015 | Mick ..................... G06Q 30/08 705/26.3 |

(Continued)

OTHER PUBLICATIONS

International Search Report and Written Opinion—PCT/US2016/066347—ISA/EPO—dated Jul. 7, 2017—14 pp.

(Continued)

*Primary Examiner* — Peter Hoang
(74) *Attorney, Agent, or Firm* — Shumaker & Sieffert, P.A.

(57) ABSTRACT

A graphics processing unit (GPU) may dispatch a first set of commands for execution on one or more processing units of the GPU. The GPU may receive notification from a host device indicating that a second set of commands are ready to execute on the GPU. In response, the GPU may issue a first preemption command at a first preemption granularity to the one or more processing units. In response to the GPU failing to preempt execution of the first set of commands within an elapsed time period after issuing the first preemption command, the GPU may issue a second preemption command at a second preemption granularity to the one or more processing units, where the second preemption granularity is finer-grained than the first preemption granularity.

30 Claims, 5 Drawing Sheets

(56) References Cited

U.S. PATENT DOCUMENTS

2016/0140686 A1\* 5/2016 Lueh .................. G06F 9/462
 345/522
2016/0371082 A1\* 12/2016 Yudanov ............... G06F 9/3013

OTHER PUBLICATIONS

Response to Written Opinion filed in International Application No. PCT/US2016/066347 dated Nov. 27, 2017, 5 pp.

Written Opinion issued in International Application No. PCT/US2016/066347 dated Jan. 11, 2018, 8 pp.

International Preliminary Report on Patentability issed in International Application No. PCT/US2016/066347 dated May 2, 2018, 9 pp.

\* cited by examiner

ADAPTIVE CONTEXT SWITCHING

TECHNICAL FIELD

This disclosure relates to graphics processing systems, and more particularly, to graphics processing systems that utilize preemption.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. A host central processing unit (CPU) may control the operation of the GPU by issuing one or more graphics processing commands to the GPU. Modern day CPUs are typically capable of concurrently executing multiple applications, each of which may need to utilize the GPU during execution to meet one or more scheduling deadlines. The arbitration of GPU resources between the different applications that are currently executing on the host CPU can pose a significant challenge to a host CPU, particularly in cases where certain applications may require high priority access to the GPU.

SUMMARY

This disclosure is directed to techniques for scheduling commands for execution by a graphics processing unit (GPU). The GPU may issue preemption commands to interrupt execution of a lower priority set of commands in order to execute a higher priority set of commands which may have a scheduling deadline. The preemption commands issued by the GPU may vary in levels of preemption granularity. This allows the GPU to select the preemption scheme that balances interrupting lower priority commands in time such that the GPU may be free to execute the higher priority set of commands by its scheduling deadline while minimizing the overhead to perform context switching.

In one example, this disclosure describes a method. The method may include dispatching, by a graphics processing unit (GPU), one or more commands of a first set of commands for execution on one or more processing units of the GPU; receiving, by the GPU, a notification from a host device indicating that a second set of commands are ready to execute on the GPU. The method may further include in response to receiving the notification, issuing, by the GPU, a first preemption command at a first preemption granularity to the one or more processing units of the GPU, wherein the first preemption granularity is associated with a first preemption boundary at which the one or more processing units stop execution of the first set of commands. The method may further include in response to the one or more processing units of the GPU failing to preempt execution of the first set of commands within an elapsed time period after the GPU issues the first preemption command, issuing, by the GPU, a second preemption command at a second preemption granularity to the one or more processing units of the GPU, wherein the second preemption granularity is associated with a second preemption boundary at which the one or more processing units stop execution of the first set of commands, and wherein the second preemption boundary indicates an earlier point at which to interrupt execution than the first preemption boundary.

In another example, this disclosure describes a computing device. The computing device may include a memory configured to store a first set of commands and a second set of commands. The computing device may further include at least one processor configured to: dispatch one or more commands of the first set of commands for execution on one or more processing units of the at least one processor; receive a notification from a host device indicating that the second set of commands are ready to execute on the at least one processor; in response to receiving the notification, issue a first preemption command at a first preemption granularity to the one or more processing units of the at least one processor, wherein the first preemption granularity is associated with a first preemption boundary at which the one or more processing units stop execution of the first set of commands; and in response to the one or more processing units of the at least one processor failing to preempt execution of the first set of commands within an elapsed time period after the at least one processor issues the first preemption command, issue a second preemption command at a second preemption granularity to the one or more processing units of the at least one processor, wherein the second preemption granularity is associated with a second preemption boundary at which the one or more processing units stop execution of the first set of commands, and wherein the second preemption boundary indicates an earlier point at which to interrupt execution than the first preemption boundary.

In another example, this disclosure describes an apparatus. The apparatus may include means for dispatching one or more commands of a first set of commands for execution on one or more processing units. The apparatus may further include means for receiving a notification from a host device indicating that a second set of commands are ready to execute. The apparatus may further include means for, in response to receiving the notification, issuing a first preemption command at a first preemption granularity to the one or more processing units, wherein the first preemption granularity is associated with a first preemption boundary at which the one or more processing units stop execution of the first set of commands. The apparatus may further include means for, in response to the one or more processing units failing to preempt execution of the first set of commands within an elapsed time period after issuance the first preemption command, issuing a second preemption command at a second preemption granularity to the one or more processing units, wherein the second preemption granularity is associated with a second preemption boundary at which the one or more processing units stop execution of the first set of commands, and wherein the second preemption boundary indicates an earlier point at which to interrupt execution than the first preemption boundary.

In another example, this disclosure describes a non-transitory computer readable storage medium comprising instructions that upon execution by one or more processors cause the one or more processors to: dispatch one or more commands of a first set of commands for execution on one or more processing units of the one or more processors; receive a notification from a host device indicating that a second set of commands are ready to execute on the one or more processors; in response to receiving the notification, issue a first preemption command at a first preemption granularity to the one or more processing units of the one or more processors, wherein the first preemption granularity is associated with a first preemption boundary at which the one or more processing units stop execution of the first set of commands; and in response to the one or more processing units of the one or more processors failing to preempt execution of the first set of commands within an elapsed time period after the one or more processors issues the first preemption command, issue a second preemption command at a second preemption granularity to the one or more processing units of the one or more processors, wherein the second preemption granularity is associated with a second preemption boundary at which the one or more processing units stop execution of the first set of commands, and wherein the second preemption boundary indicates an earlier point at which to interrupt execution than the first preemption boundary.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
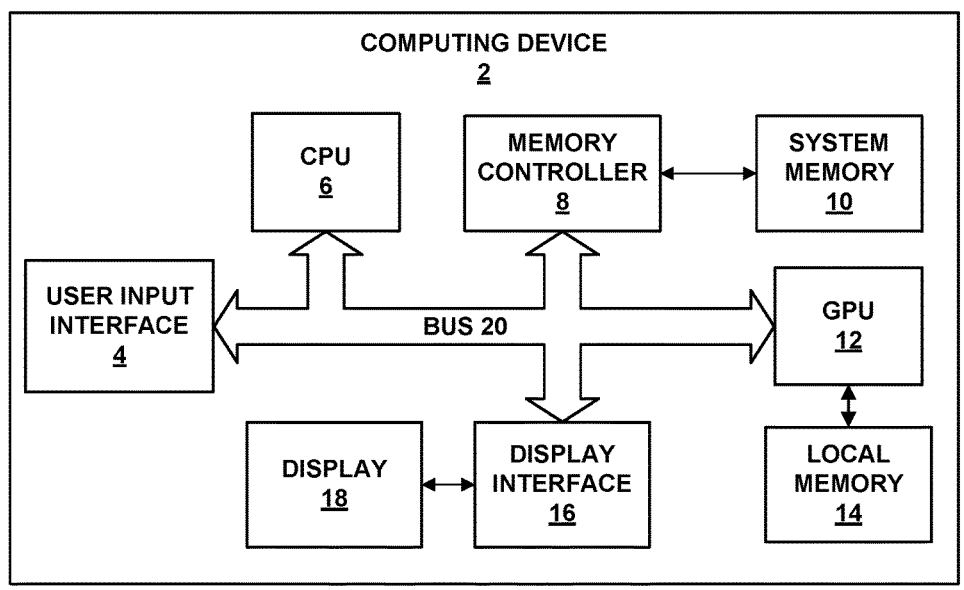
FIG. 1 is a block diagram illustrating an example computing device that may be used to implement the techniques of this disclosure.

This disclosure is directed to preemption techniques for scheduling graphics processing unit (GPU) processes. Preemption refers to having a processor (e.g., GPU) stop execution of a first set of commands for a second set of commands, and then completes the execution of the first set of commands after completing the execution of the second set of commands. For example, a GPU preempts executing a low-priority set of commands for a higher-priority set of commands. In another example, the GPU may preempt execution of a first set of commands for a second set of commands that have the same priority.

An example of a relative high priority set of commands is commands for rendering a graphical user interface (GUI). A sequence of commands may be organized as a command stream. GPUs are increasingly being used for user interface (UI) rendering. UI command streams typically benefit from being serviced in a timely fashion in order to achieve the proper visual effects and responsiveness that users have come to expect in a UI. When a high-priority UI command stream is queued by a host CPU to be executed on a GPU, the GPU may be executing another queued command stream associated with a different context that has a lower priority, such as, e.g., a non-UI graphics context or a context that uses a GPU to perform a general-purpose computing task (i.e., a general-purpose computing on graphics processing unit (GPGPU) task). Waiting for the lower-priority context to complete execution prior to executing the higher-priority UI command stream may not, in some cases, produce an acceptable user experience with respect to the UI.

Lower or low-priority commands and higher or high-priority commands are relative terms used to indicate importance of timely execution of the commands. As an example, commands that should be executed as quickly as possible so as to not interfere with user experience will be of higher-priority compared to commands that if slightly delayed in execution would not greatly diminish user experience. As an example, if the execution of UI commands is delayed, user experience will be negatively impacted because response to user interaction will be delayed. If execution of commands for some matrix operations happening in the background is delayed, there may be little affect on user experience.

There may be other ways in which to qualify commands as higher-priority or lower-priority other than based only on user experience. This disclosure uses the terms higher-priority and lower-priority as relative terms to describe examples of switching from one set of commands to another set of commands. However, the techniques described in this disclosure need not necessarily be limited to examples where switching of commands only occurs for transitioning from low-priority commands to high-priority commands. As discussed above, the techniques described in this disclosure are equally applicable to switching of commands for transitioning between processing of commands having the same level of priority, such as to provide a form of fair scheduling to prevent one particular context from starving other contexts.

Switching from executing a first set of commands to a second set of commands before completion of execution of the first set of commands is referred to as GPU context switching or preemption. Context switching or preemption is useful for hardware acceleration for various GPU workloads like virtualization, UI, graphics/compute apps etc., as well as timely forward progress of various commands. The need for more frequent preemption is arising due to, for example, new use cases, such as virtual reality (time warp, per frame requirements) and automotive use where rendering delays may be undesirable or unacceptable.

One solution to this problem is to allow the host CPU to preempt execution of the lower-priority command stream at arbitrary points and to service a higher-priority command stream whenever the host CPU determines that it is beneficial or desirable to execute the higher-priority command stream first. However, such a solution can be expensive in terms of the overhead (e.g., additional processing time, additional memory bandwidth usage, and/or additional memory usage) needed to perform context switching in the GPU at arbitrary points in the GPU command stream.

Some GPUs provide for draw call level preemption (e.g., preemption after the issued draw call is completed). The draw call may define the plurality of primitives that are to be rendered. However, draw call level preemption may be inadequate for certain cases because the issued draw call may not be completed in time to service the higher-priority command stream in order to meet a scheduling deadline associated with the higher-priority command stream.

To address such issues, finer-grained preemption may be useful. A particular level of preemption may be finer-grained than draw call level preemption if it preempts the GPU prior to completion of the issued draw call. For example, some GPUs may also provide for sub-draw call level preemption (e.g., preemption before the issued draw call is completed) or even instruction level preemption (e.g., preemption after completing execution of the current GPU instruction). However, such finer-grained preemption may accrue higher computational overhead (e.g., processing time, memory bandwidth, and power) to perform context switching compared with draw call level preemption, and may not be necessary when the higher-priority command stream is associated with a scheduling deadline that could possibly be met via draw call level preemption.

Accordingly, aspects of the present disclosure are directed to techniques for the GPU to issue preemption commands and various degrees of granularity, to ensure that higher-priority command streams may meet associated scheduling deadlines while minimizing the overhead to perform context switching. For example, the GPU may dispatch one or more commands of a first set of commands for execution on one or more processing units of the GPU. The GPU may then receive a notification from a host device indicating that a second set of commands are ready to execute on the GPU. In one example, the second set of commands may have a scheduling priority that is greater than a scheduling priority of the first set of commands. In response to receiving the notification, the GPU may issue a first preemption command at a first preemption granularity to the one or more processing units of the GPU. In response to the GPU failing to preempt execution of the first set of commands within an elapsed time period after issuing the first preemption command, the GPU may issue a second preemption command at a second, lower preemption granularity to the one or more processing units of the GPU. The second preemption granularity is finer-grained than the first preemption granularity. In this way, the GPU may issue multiple preemption commands at varying levels of granularity to ensure that higher-priority command streams may meet associated scheduling deadlines while minimizing the overhead to perform context switching.

FIG. 1 is a block diagram illustrating an example computing device 2 that may be used to implement the techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer, an advanced driver assistance system (ADAS), a virtual reality headset, a drone, or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, a Vulkan API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store sets of commands, such as command streams, for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18.

Thus, when one of the software applications executing on CPU 6 requires graphics processing, CPU 6 may provide graphics commands and graphics data to GPU 12 for rendering to display 18. The graphics commands may include, e.g., drawing commands, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to act as a general purpose graphics processing unit (GPGPU) to process certain types of vector and matrix operations for general-purposed computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU local memory 14. Thus, GPU 12 may read data from and write data to local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. Local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

The techniques described in this disclosure relate to preemption. In preemption, GPU 12 may pause the execution of one set of commands, execute another set of commands to completion, and then complete execution of the original set of commands. For example, GPU 12 may be executing a set of commands when CPU 6 determines that another set of higher priority commands are to be executed. As an illustration, GPU 12 is executing commands for generating content of a video game when CPU 6 determines that commands for a user interface are to execute first in response to the user interacting with display 18, which may be a touchscreen. In this example, GPU 12 may complete executing commands to generate the user-interface even if completing the execution of the commands for the video game is delayed.

In some cases, GPU 12 may be configured to provide draw call level preemption. For example, preemption may only be allowed at draw call boundaries. In this example, if GPU 12 began executing a draw call, and then receives instructions to preempt, GPU 12 cannot preempt until completion of the execution of the draw call (e.g., complete execution of a pixel shader for rendering of all primitives and pixel tiles).

However, only having preemption at draw call boundaries may be undesirable for certain cases. For instance, completing the draw call for a "group of primitives" may take a long time (e.g., due to execution of vertex shaders, pixel shaders, other shaders, and all of the functions of fixed function units in response to the draw call) delaying the execution of the higher priority commands. As more examples, single primitive level preemption may also be insufficient, and draw call level preemption may not function well for large sized triangles (for e.g. covering one bin or screen). The draw call may define the plurality of primitives that are to be rendered.

GPU 12 may also be configured to provide fine grain preemption (e.g., preemption that does not have to occur at draw call boundaries). In some cases, workloads like VR may benefit from a finer granularity of preemption than draw call boundaries to support time-warp (per frame). The techniques described in this disclosure may provide for such finer granularity of preemption, as well as issuing preemption commands at different levels of preemption granularity to dynamically provide a more "needs based" preemption scheme.

In accordance with an aspect of the present disclosure, GPU 12 may dispatch one or more of a first set of commands for execution on one or more processing units of GPU 12. GPU 12 may then receive a notification from a host device indicating that a second set of commands are ready to execute on GPU 12. In response to receiving the notification, GPU 12 may issue a first preemption command at a first preemption granularity to the one or more processing units of GPU 12. For example, GPU 12 may issue the first preemption command at a draw call level granularity.

In response to GPU 12 failing to preempt execution of the first set of commands within an elapsed time period after issuing the first preemption command, GPU 12 may issue a second preemption command at a second preemption granularity to the one or more processing units of the GPU, wherein the second preemption granularity is finer-grained than the first preemption granularity. In this example, GPU 12 may issue the second preemption command at a sub-draw call level granularity. Upon GPU 12 reaching a point in the first set of commands indicated by the sub-draw call level granularity, GPU 12 may perform a context switch to start execution of the second set of commands. Such escalation of preemption may be transparent to CPU 6, so that CPU 6 may not receive any indication that GPU 12 has issued a first preemption command and any subsequent finer-grained preemption commands.

In this disclosure, the examples are described with respect to graphics processing. However, the techniques described in this disclosure are not so limited, and extend to examples where a non-graphics application (e.g., compute shader) executes on GPU 12. The terms draw call should not be considered exclusively limited to graphics applications, and should be considered as covering analogous commands and groups of data for when GPU 12 is executing compute shaders (e.g., non-graphics related to applications such as matrix or vector operation).

Figure 2:
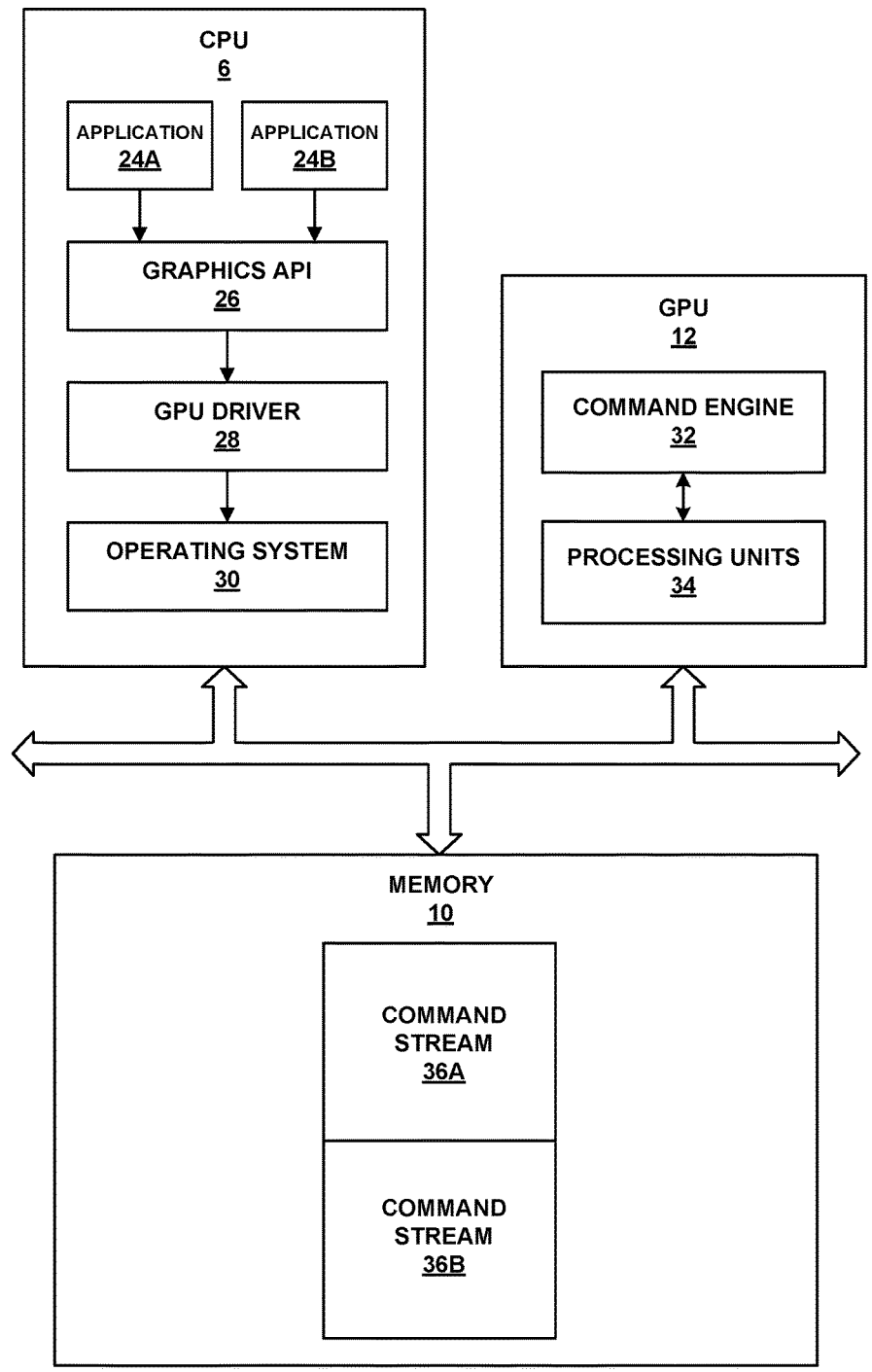
FIG. 2 is a block diagram illustrating the CPU, the GPU and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute software applications 24A, 24B, a graphics API 26, a GPU driver 28 and an operating system 30. GPU 12 includes a command engine 32 and one or more processing units 34. Memory 10 stores command streams 36A, 36B.

Software applications 24A and 24B may each include at least one of one or more instructions that cause graphics images to be displayed or one or more instructions that cause a non-graphics task (e.g., a general-purposed computing task) to be performed on GPU 12. Software applications 24A and 24B may issue instructions to graphics API 26. Graphics API 26 may be a runtime service that translates the instructions received from software applications 24A, 24B into a format that is consumable by GPU driver 28. One example of an instruction that software applications 24A and 24B may issue is a draw call, which is an instruction for GPU 12 to render one or more primitives. Graphics API 26 may translate the draw call into one or more commands that GPU 12 may execute to perform the rendering of the one or more primitives. Thus, GPU driver 28 can translate a single instruction, such as a draw call, that is issued by software applications 24A and 24B into one or more commands to be executed by GPU 12.

GPU driver 28 receives the instructions from software applications 24A, 24B, via graphics API 26, and controls the operation of GPU 12 to service the instructions. For example, GPU driver 28 may formulate one or more command streams 36A, 36B, place the command streams 36A, 36B into memory 10, and instruct GPU 12 to execute command streams 36A, 36B. GPU driver 28 may place command streams 36A, 36B into memory 10 and communicate with GPU 12 via operating system 30, e.g., via one or more system calls.

GPU driver 28 may send a preemption notification to GPU command engine 32 to indicate that another command stream (e.g., a high-priority command stream) is ready for execution. In some examples, the preemption notification may also indicate to GPU 12 which command stream to execute upon preemption of the command stream currently being executed. GPU driver 28 may send a preemption notification to GPU command engine 12, for example, by writing one or more values (e.g., via operating system 30) to one or more GPU registers that are polled by GPU command engine 32. The one or more GPU registers may include one or more hardware GPU registers that are located in GPU 12, one or more memory-mapped GPU registers that are located in a memory (e.g., memory 10) or any combination thereof. When writing values to a memory-mapped GPU register, CPU 6 may write the values to one or more particular memory addresses in memory 10 that are polled by GPU command engine 32. In some examples, GPU driver 28 may write a first value to one or more GPU registers to activate a preemption notification, and write a second value to the one or more GPU registers that identifies the location of the command stream to execute upon preemption of the command stream currently being executed.

Command engine 32 is configured to retrieve the commands stored in command streams 36A, 36B, and dispatch the commands for execution on one or more of processing units 34. Command engine 32 may dispatch commands from a command stream for execution on all or a subset of processing units 34. In some examples, command engine 32 may be configured to poll one or more GPU registers that indicate whether CPU 6 has sent a preemption notification to GPU 12. In cases where the GPU registers are memory-mapped registers, command engine 32 may be configured to poll one or more particular memory addresses in memory 10 that indicate whether CPU 6 has sent a preemption notification to GPU 12. In response to the one or more GPU registers indicating that CPU 6 has sent a preemption notification to GPU 12, command engine 32 may send a preemption command to processing units 34 of GPU 12 to attempt to preempt execution of the GPU command stream that is currently executing, and begin to execute another command stream. In some cases, command engine 32 may be configured to determine the command stream to execute upon preemption of the currently executing command stream by reading information stored in the one or more GPU registers 12 that identifies the command stream to execute upon preemption. For example, CPU 6 may store a pointer in the one or more GPU registers that identifies the memory location of the higher priority command stream.

Command engine 32 may be hardware of GPU 12, may be software or firmware executing on GPU 12, or a combination of both. Also, the above description for how command engine 32 determines whether an instruction to preempt is received is provided for purposes of illustration only. There may be other way for CPU 6 to instruct GPU 12 to preempt, and the techniques described herein are not limited to any specific example.

To preempt a command stream, command engine 32 may save a state of GPU 12 associated with execution of the command stream. The state of GPU 12 associated with the execution of the command stream may include program counters, thread activation states, graphics drawing state variables (such as, e.g., color, primitive type, transform type, etc.), memory state and/or any other state that is used to execute the command stream. In some examples, the state variables may be local state variables associated with individual processing units 34 or groups of processing units 34, global state variables associated with the global execution of GPU 12, or any combination thereof. Saving the state of GPU 12 may involve, for example, storing the current values of one or more registers in GPU 12 in another on-chip or off-chip location. Saving the state of GPU 12 may involve, for example, storing the current state of local GPU memory in another on-chip or off-chip location. In some examples, command engine 32 may save the GPU state to memory 10.

After execution of the preempting command stream has completed, command engine 32 may restore the saved state of the preempted command stream that was executing prior to the preemption notification. Restoring the saved state may involve, for example, reloading state variables into the one or more registers of GPU 12 and/or reloading a saved memory state into local GPU memory. In examples where the GPU state is saved to memory 10, command engine 32 may reload the saved state stored in memory 10 onto GPU 12 for further execution of the preempted command stream.

Processing units 34 may include one or more processing units, each of which may be a programmable processing unit or a fixed function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

In the example graphics processing system of FIG. 2, memory 10 includes two command streams 36A, 36B, each command stream 36A, 36B being associated with a different graphics application context (i.e., a different one of software applications 24A, 24B). For example, command stream 36A is associated with a graphics application context for software application 24A, and command stream 36B is associated with a graphics application context for software application 24B. For ease of illustration, two GPU command streams 36A, 36B are depicted as being stored in memory 10 of the example graphics processing system of FIG. 2. In other examples, however, the same or a different number of GPU command streams may be used that are stored in the same or different components of a graphics processing system.

In the above example, the two command streams 36A and 36B between which GPU 12 switches are command streams from two different applications 24A and 24B. However, the examples described in this disclosure are not so limited. In some examples, GPU 12 may switch between command streams of the same application if needed (e.g., a high priority command stream of application 24A preempts a low priority stream of application 24A). The command streams described in this disclosure should not be considered limited to being for different applications, and may be for the same application.

GPU driver 28 of CPU 6 may be configured to write command streams 36A, 36B to memory 10, and command engine 32 of GPU 12 may be configured to read one or more commands of command streams 36A, 36B from memory 10. In some examples, one or both of command streams 36A, 36B may be stored as a ring buffer in memory 10. A ring buffer may be a buffer with a circular addressing scheme where CPU 6 and GPU 12 maintain synchronized state variables associated with the writing of data to and reading of data from the ring buffer. For example, if command stream 36A is a ring buffer, each of CPU 6 and GPU 12 may store a write pointer indicating the next address to be written to in the ring buffer, and a read pointer indicating the next address to be read from in the ring buffer. When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 28 and an example GPU command engine 32 designed in accordance with this disclosure will now be described with respect to FIG. 2. In this example, software application 24B has a higher scheduling priority than the scheduling priority of software application 24A. In one example, software application 24B may be a user interface (UI) software application that includes one or more instructions that cause a graphics image to be displayed and that demands high priority access to GPU 12 to ensure timely updates of the UI. Meanwhile, in this example, software application 24A is a lower-priority application that includes one or more instructions that cause graphics images to be displayed and/or one or more instructions that cause a non-graphics task (e.g., a GPGPU computing task) to be performed on GPU 12.

GPU driver 28 receives one or more instructions from software application 24A that specify graphics operations and/or general-purpose computing operations to be performed by GPU 12, and may generate command stream 36A based on the one or more instructions from software application 24A. GPU driver 28 places output command stream 36A into memory 10, which is accessible by GPU command engine 32. GPU driver 28 notifies GPU command engine 32 that command stream 36A corresponding to software application 24A is available for processing. For example, GPU driver 28 may write one or more values indicating that command stream 36A is ready for execution to a GPU register (e.g., a GPU hardware register polled by GPU 12 and/or a GPU memory-mapped register polled by GPU 12).

Upon notification that command stream 36A is ready for execution, command engine 32 of GPU 12 may determine if resources are currently available on GPU 12 to begin executing command stream 36A. If resources are available, command engine 32 begins to dispatch the commands in command stream 36A. Meanwhile, GPU driver 28 receives one or more instructions from UI software application 24B that specify high-priority graphics operations to be performed by GPU 12. GPU driver 28 generates a high-priority command stream 36B to carry out the operations specified by the received instructions, and places the resulting command stream 36B into memory 10. GPU driver 28 provides a preemption notification to GPU command engine 32 indicating that high-priority command stream 36 is ready for processing and that command stream 36 should preempt any other lower-priority command streams that are executing on GPU 12. In some examples, GPU driver 28 may provide the preemption notification to GPU 12 by writing to a GPU hardware register that is polled by the GPU 12 and/or by writing to a memory-mapped register (e.g., a particular location in memory 10) that is polled by GPU 12.

In some cases, GPU driver 28 or CPU 6 may define preemption levels for different applications or commands of the same application. For example, command stream 36B has a higher priority than command stream 36A, but may also have a lower priority than a third command stream. In this example, if command stream 36A is executing, GPU driver 28 or CPU 6 may cause GPU 12 to preempt command stream 36A with either command stream 36B or the third command stream. However, if command stream 36B is executing, then only the third command stream may preempt, and no stream may preempt the third stream. This example may be extended to "n" streams and there may be other factors for which streams can preempt with other streams.

In some examples, the higher priority command stream may be associated with a scheduling deadline by which GPU 12 is scheduled to finish execution of those commands. In rendering graphics data, the scheduling deadline may be the time at which the next vertical synchronization (VSYNC) of display 18 takes place. Specifically, GPU 12 may execute the commands of command streams 36A and/or 36B to render image data, and may store rendered image data in a back buffer that is allocated within system memory 10. At each VSYNC of display 18, GPU 12 may copy the contents of the back buffer into a front buffer such that at a corresponding refresh of display 18, display interface 16 may retrieve image data from the front buffer for display by display 18. If GPU 12 does not finish executing the commands by the VSYNC, then display 18 may display an incomplete or incorrect image.

Similarly, in the context of virtual reality, GPU 12 may perform a time warp to warp a rendered image to compensate for head motion that occurs after the image is rendered. Thus, GPU 12 may execute commands of command streams 36A and/or 36B to render an image in time for GPU 12 to time warp the rendered image prior to the next VSYNC.

In the techniques described in this disclosure, GPU 12 may issue multiple preemption commands at different preemption granularities to interrupt processing units 34's execution of a first set of commands in response to GPU 12 receiving an indication that a second, higher-priority set of commands is ready for execution. GPU 12 may select an appropriate granularity at which to preempt execution of a lower priority set of commands in lieu of executing a higher priority set of commands such that the higher priority set of commands may meet an associated scheduling deadline but while minimizing overhead needed for preemption.

As an example, if both a first preemption scheme and a second preemption scheme allow the second, higher priority set of commands to timely execute (e.g., meet an associated scheduling deadline) and the second preemption scheme has a lower overhead than the first preemptions scheme, then GPU 12 performs preemption using the second preemption scheme. If the first preemption scheme allows timely execution of the second set of commands, and the second preemption scheme does not, then GPU 12 performs preemption using the first preemption scheme even if the second preemption scheme uses less overhead. In some examples, GPU 12 may attempt a preemption using one preemption scheme and switch to another preemption scheme if the first preemption scheme was not successful in providing timely switching.

In the example of GPU processing graphics commands for rendering an image, GPU 12 may be configured to provide draw call level preemption, so that preemption may only be allowed at draw call boundaries. As discussed above, software application software application 24A or software application 24B may issue draw call instructions to GPU driver 28, which may translate each draw call instruction into one or more commands in command stream 36A or command stream 36B. In this example, if GPU 12 began executing commands resulting from a draw call issued by one of software application software application 24A or software application 24B, and then receives instructions to preempt, GPU 12 may not preempt until processing units 34 complete the execution of the commands that corresponds to the draw call (e.g., complete execution of a pixel shader for rendering of a plurality of primitives). In other words, for draw call level preemption, GPU 12 may only be able to preempt at command boundaries between commands making up separate draw calls.

GPU 12 may also support sub-draw call level preemption, so that preemption may be allowed even if not all of the commands making up the draw call have been executed. In this example, GPU 12 may preempt after rendering a "group" of pixels (but not necessarily all of the pixels associated with the draw call). Thus, GPU 12 may be able preempt after processing units 34 executes some, but not all, of a set of commands making up a draw call. GPU 12 may also support instruction-level preemption. In this example, GPU 12 may preempt after executing the current command being processed by processing units 34.

A draw call may direct GPU 12 to render one or more primitives by processing the one or more primitives through a graphics processing pipeline to render the one or more primitives. To process the draw call to render the one or more primitives, the GPU may execute one more more sub-draw commands, such as by executing shader programs making up one or more stages of the graphics processing pipeline. Thus, GPU 12 may preempt at a sub-draw call level by interrupting processing of a draw call before completing execution of all of the sub-draw calls of the graphics processing pipeline. For example, if a draw call directs GPU 12 to render a plurality of primitives, GPU 12 may preempt at a primitive level by interrupting processing of a draw call after GPU 12 has executed some (but not all) of the sub-draw calls to render one or more (but fewer than all) of the primitives that a draw call directs GPU 12 to render. Similarly, GPU 12 may preempt at a pixel tile level by interrupting processing of a draw call after GPU 12 has executed some (but not all) of the sub-draw calls to rendering a group of pixels making up a pixel tile of all of the pixel times that a draw call directs GPU to render. Such preemption at a pixel tile level may be finer-grained than preemption at the primitive level. In another example, GPU 12 may preempt at a sub-draw call level by interrupting processing of the draw call before completion of processing the draw call through all of the stages of the graphics processing pipeline (e.g., preempting the graphics processing pipeline after completion of the rasterizer stage but prior to execution of the pixel shading stage).

Draw call level preemption, sub-draw call level preemption, and instruction level preemption are different examples of preemption granularity. As discussed above, a draw call may include a plurality of sub-draw calls that GPU 12 may execute. A preemption command is finer-grained than another preemption command if it is associated with a preemption boundary that bounds more commands than a preemption boundary associated with the other preemption command. Thus, while a draw call level preemption may be associated with a draw call level boundary that bounds a draw command which is associated with a plurality of sub-draw level calls to be executed by GPU 12, a sub-draw call level preemption may be associated with a sub-draw call level boundary which bounds one or more, but fewer than all, of the sub-draw commands that make up a draw call. Similarly, an instruction level preemption may be associated with an instruction level boundary that bounds a single sub-draw command of the sub-draw commands that make up the draw call.

In the example of GPU 12 preempting execution of command stream 36A to execute the commands of command stream 36B having a higher priority than command stream 36A, GPU 12 may issue one or more preemption commands to preempt processing of command stream 36A. In response to receiving a preemption notification from GPU driver 28 indicating that command stream 36B is ready for processing, GPU 12 may issue a first preemption command at a first one of a plurality of preemption granularities to processing units 34 of GPU to preempt processing of command stream 36A.

If processing units 34 have yet to interrupt processing of command stream 36A after a period of time has elapsed subsequent to issuing the first preemption command, GPU 12 may issue a second preemption command at a second one of the plurality of preemption granularities to processing units 34 to preempt processing of command stream 36A. The second one of the plurality of preemption granularities may be finer-grained than the first one of the plurality of preemption granularities. For example, if the first preemption command was a draw call level preemption command, the second preemption command may be a sub-draw call level preemption command.

GPU 12 may determine how long after the issuance of the first preemption command to issue the second preemption command in a number of exemplary ways. In one example, GPU 12 may wait for a fixed period of time to elapse before issuing the second preemption command. The fixed period of time may be a time-based period of time (e.g., a fixed number of nanoseconds) or a clock cycle-based period of time (e.g., a fixed number of clock cycles of GPU 12). The fixed period of time may be specified by GPU 12 or CPU 6, or may be associated with the higher priority command stream 36B that is waiting to be executed by GPU 12. The fixed period of time may also differ between different levels of preemption granularities. For example, GPU 12 may wait a relatively longer period of time after issuing a draw call level preemption command before issuing a primitive level preemption command, but may wait a relatively shorter period of time after issuing a primitive level preemption command before issuing a pixel tile level preemption command.

In another example, GPU 12 may wait for a time period to lapse that is based on the estimated time for processing units 34 to reach the particular preemption boundary associated with the first preemption command. For example, if the first preemption command was a draw call level preemption command, GPU 12 may estimate the length of time for processing units 34 to reach the draw call level boundary. GPU 12 may estimate such a period of time using any suitable method, such as by measuring the time it takes for processing units 34 to execute the commands making up "n" previous draw calls to determine an average elapsed time for executing one draw call. GPU 12 may estimate the remaining time for processing units 34 to reach the draw call level boundary based on sampling processing units 34's progress in executing commands of the current draw call as well as the average elapsed time for executing one draw call.

For example, if it takes on average 10 milliseconds for processing units 34 to execute a single draw call, and GPU 12 estimates, based on sampling processing units 34's progress that processing units 34 have executed half of the sub-draw commands making up the draw call, GPU 12 may estimate that it may take processing units 34 another 5 milliseconds to complete execution of the current draw call and reach the draw call boundary. Thus, GPU 12 may issue a draw call level preemption command and wait for 5 milliseconds to elapse before issuing a subsequent finer-grained preemption command.

GPU 12 may also determine how long after the issuance of the first preemption command to issue the second preemption command based at least in part on a scheduling deadline associated with the higher priority command stream that is waiting to be executed by GPU 12. As discussed above, the scheduling deadline may correspond to the time at which the next VSYNC occurs for display 18. GPU 12 may receive an indication of the scheduling deadline associated with command stream 36B from CPU 6 or, in the case of the scheduling deadline corresponding to the next VSYNC, from display interface 16.

GPU 12 may determine the length of time for processing units 34 to execute the commands of command stream 36B. For example, GPU 12 may perform profiling of the commands making up command stream 36B to determine the type of commands included in command stream 36B and may determine the length of time for processing units 34 to execute the commands of command stream 36B based on the profiling. GPU 12 may also measure the length of time for processing units 34 to execute previous command streams having scheduling deadlines that correspond to a VSYNC, and may estimate the length of time for processing units 34 to execute the commands of command stream 36B based on the measured time to execute those previous command streams.

GPU 12 may subtract the scheduling deadline associated with command stream 36B by the determined length of time for processing units 34 to execute the commands of command stream 36B to determine the time at which GPU 12 may interrupt processing units 34's execution of command stream 36A in order to finish execution of command stream 36B by its scheduling deadline. Subsequent to GPU 12 issuing the second preemption command to processing units 34 to preempt execution of command stream 36A, but prior to the time at which GPU 12 should interrupt processing units 34's execution of command stream 36A in order to finish execution of command stream 36B by its scheduling deadline, GPU 12 may issue a third preemption command at a third one of the plurality of preemption granularities that may be finer-grained than the first and second ones of the plurality of preemption granularities. For example, if the first preemption command was a draw call level preemption command, and if the second preemption command was a sub-draw call level preemption command (e.g., a primitive level preemption command), the third preemption command may be another sub-draw call preemption command (e.g., a pixel tile level preemption command) at a finer-grained preemption level than the previous sub-draw call preemption command or an instruction-level preemption command.

Figure 3:
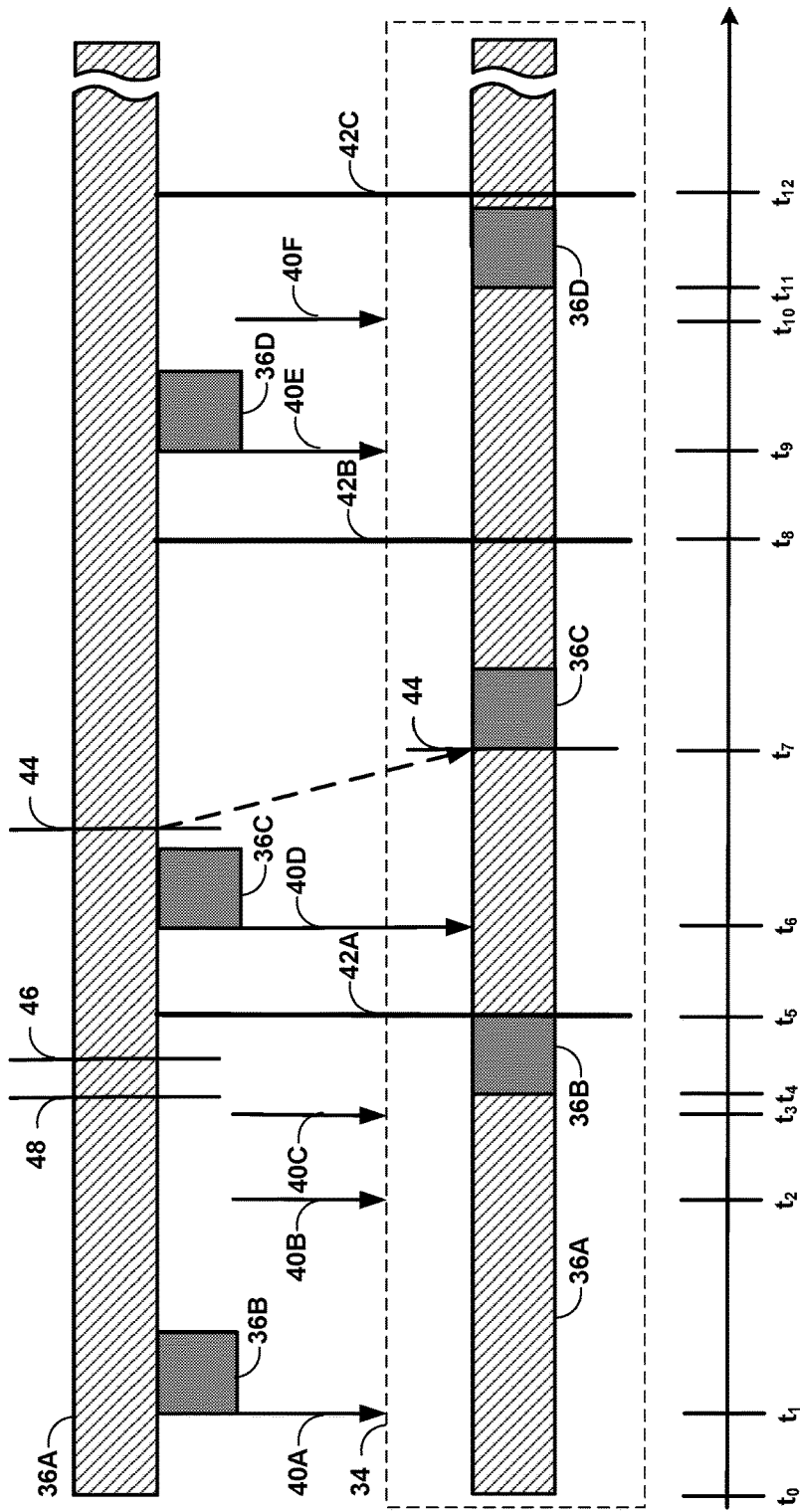
FIG. 3 is a conceptual diagram illustrating various techniques for preemption at varying preemption granularities in accordance with this disclosure.

FIG. 3 is a conceptual diagram illustrating various techniques for preemption at varying preemption granularities in accordance with this disclosure. As shown in FIG. 3, GPU 12 may, at time $t_0$, dispatch the commands of command stream 36A for execution on processing units 34. GPU 12 may subsequently receive a notification from CPU 6 indicating that command stream 36B having a relatively greater scheduling priority than command stream 36A is ready to execute on GPU 12. In response to receiving the notification from CPU 6, command engine 32 of GPU 12 may, at time $t_1$, issue preemption command 40A to one or more processing units 34 at a specified preemption granularity.

In response to receiving the notification that a higher priority command stream is ready to execute on GPU 12, command engine 32 of GPU 12 may start out by issuing an initial preemption command to one or more processing units 34 at a relatively coarse preemption granularity. In this example, if command stream 36A includes commands making up one or more draw calls, command engine 32 of GPU 12 may issue preemption command 40A that is a draw call level preemption command out of preemption commands at the draw call level, the sub-draw call level, and the instruction level.

By command engine 32 of GPU 12 issuing a draw call level preemption command, processing units 34 may continue to execute commands of command stream 36A making up a draw call that processing units 34 are currently processing until processing units 34 reach the next draw call boundary of command stream 36A. A draw call boundary may be a boundary between sets of commands of command stream 36A that make up individual draw calls issued by a software application (e.g., software application 24A) to GPU 12 through GPU driver 28. Thus, when GPU 12 issues a draw call level preemption command, such as preemption command 40A, processing units 34 continues to execute commands of command stream 36A until it has finished executing commands that make up the same draw call and reaches draw call boundary 44 that bounds the commands of the current draw call from the commands of the next draw call.

If GPU 12 fails to interrupt execution of command stream 36A within an elapsed time period after issuing preemption command 40A, GPU 12 may dynamically attempt to once again preempt processing units 34's execution of command stream 36A by issuing a subsequent preemption command at a relatively finer preemption granularity than preemption command 40A. Such an elapsed time period may elapse prior to the time at which the scheduling deadline associated with command stream 36B occurs, such as a predetermined length of time or number of clock cycles of GPU 12, or may be dynamically determined by GPU 12 as described above.

Thus, at time $t_2$, GPU 12 may issue preemption command 40B, which may be a sub-draw call level preemption command. The sub-draw call level preemption command may be associated with sub-draw call level boundary 46A that occurs in command stream 36A prior to draw call level boundary 44A. By GPU 12 issuing a sub-draw call level preemption command, processing units 34 may continue to execute some but not all of the commands of command stream 36A making up a draw call processing units 34 are currently processing until processing units 34 reach sub-draw call level boundary 46A. For example, sub-draw call level boundary 46A may bound one or more sub-draw level commands that are executed by GPU 12 for rendering a group of pixels making up a pixel tile from another one or more sub-draw level commands in command stream 36A for rendering another group of pixels making up a pixel tile, out of a draw call that includes rendering a plurality of pixel tiles. Thus, in response to receiving preemption command 40B, processing units 34 may continue to execute commands to render pixels of a group of pixels making up a pixel tile until processing units 34 have finished rendering the pixel tile and has reached sub-draw call level boundary 46A.

If GPU 12 fails to interrupt execution of command stream 36A within an elapsed time period after issuing preemption command 40B, GPU 12 may attempt to once again preempt processing units 34's execution of command stream 36A by issuing a subsequent preemption command at a relatively finer preemption granularity than preemption command 40B. Such an elapsed time period may be a predetermined length of time or number of clock cycles of GPU 12, or may be dynamically determined by GPU 12 as described above. Such an elapsed time period may also be the same as or different than the elapsed time period between the issuance of preemption commands 40A and 40B.

The time at which GPU 12 issues a preemption command subsequent to issuing preemption command 40B may also be determined based at least in part on a scheduling deadline associated with command stream 36B. In the example of FIG. 3, GPU 12 may determine, at time $t_3$, that processing units 34 must be interrupted as soon as possible in order for command stream 36B to meet its scheduling deadline 42A at time $t_5$, and may issue preemption command 40C to processing units 34 at a relatively finer preemption granularity than either preemption command 40A or preemption command 40B to preempt execution of command stream 36A.

Preemption command 40C may be an instruction level preemption command associated with instruction level preemption boundary 46. As discussed above, an instruction level preemption boundary appears indirectly in the command stream as a sub-draw call level command that GPU 12 may execute as part of executing shader programs to perform one or more stages of a graphics processing pipeline.

Upon processing units 34 finishing execution of the currently executing command and reaching instruction level boundary 48 associated with preemption command 40C at time $t_4$, GPU 12 may stop execution of command stream 36A and may perform a context switch to switch from executing command stream 36A to executing command stream 36B.

Processing units 34 may finish execution of command stream 36B by scheduling deadline 42A associated with command stream 36B. Upon processing units 34 finishing execution of command stream 36B, GPU 12 may perform a context switch to restart execution of command stream 36A if there are no other pending command streams with a higher priority than command stream 36A that are ready for execution by GPU 12. GPU 12 may restart execution of command stream 36A starting from the same point at which it stopped execution of command stream 36A.

As processing units 34 of GPU 12 executes command stream 36A, GPU 12 may subsequently receive a notification from CPU 6 indicating that command stream 36C having a relatively greater scheduling priority than command stream 36A is ready to execute on GPU 12. Command stream 36C may have an associated scheduling deadline 42B at time $t_8$. In response to receiving the notification from CPU 6, GPU 12 may, at time $t_6$, issue preemption command 40D at a specified preemption granularity to processing units 34 of GPU 12. In the example of FIG. 3, preemption command 40D may be a draw call level preemption command.

Because processing units 34, in executing command stream 36A have not yet reached draw call level boundary 44 prior to the issuance of preemption command 40D, processing units 34 may continue to execute sub-draw call level commands making up the draw call until it reaches draw call boundary 44. After issuing preemption command 40D, GPU 12 may wait a specified amount of time before issuing a subsequent preemption command if processing units 34 has yet to be preempted in the meantime. While GPU 12 is waiting before issuing a subsequent preemption command, processing units 34 may reach draw call level boundary 44 at time $t_7$ and may therefore stop execution of command stream 36A and may perform a context switch to switch from executing command stream 36A to executing command stream 36C. Thus, in some instances, processing units 34 may interrupt execution of command stream 36A before GPU 12 reaches an elapsed time period and issues a subsequent finer-grained preemption command.

Upon processing units 34 finishing execution of command stream 36C, GPU 12 may perform a context switch to restart execution of command stream 36A if there are no other pending command streams with a higher priority than command stream 36A that are ready for execution by GPU 12. GPU 12 may restart execution of command stream 36A starting from the same point at which it last stopped execution of command stream 36A.

As processing units 34 of GPU 12 executes command stream 36A, GPU 12 may subsequently receive a notification from CPU 6 indicating that command stream 36D having a relatively greater scheduling priority than command stream 36A is ready to execute on GPU 12. Command stream 36D may have an associated scheduling deadline 42C at time $t_{12}$. In response to receiving the notification from CPU 6, GPU 12 may, at time $t_9$, issue preemption command 40E at a specified preemption granularity to processing units 34 of GPU 12.

In one example, if processing units 34 comprise parallel processors (e.g., shader processors), command stream 36A may include, in its set of commands, data parallel code that may be executed by the parallel processors of processing units 34. For example, processing units 34 may execute the same set of commands (or sub-draw call level commands indicated by draw level commands) of command stream 36A to operate on multiple data values in parallel. For each instance of the set of commands, processing units 34 may spawn a thread, also referred to a kernel, for that instance of the set of commands, and may execute the thread on one of its parallel processors. The group of threads or kernels for a particular set of commands may be grouped into one or more workgroups, and processing units 34 may execute a workgroup of the kernels in parallel.

If processing units 34 is executing a workgroup of commands of command stream 36A when GPU 12 receives a notification that command stream 36D is ready to execute on GPU 12, GPU 12 may issue kernel level preemption command 40E at a kernel level granularity (or kernel level boundary), to preempt after processing all of the workgroups of the kernels. In response to receiving the kernel level preemption command, processing units 34 may continue to execute the commands of the currently-executing workgroup, as well as additional workgroups of the kernel, until it has finished executing each kernel. For example, if four shader processors (or other compute units) of processing units 34 are executing four kernel making up a workgroup, each of the four shader processors may complete execution of its respective kernel of the workgroup before processing units 34 and then continue on to execute kernels of the rest of the workgroups until it reaches the kernel level boundary associated with command stream 36D. Upon reaching the kernel level boundary, processing units 34 may stop execution of command stream 36A and may perform a context switch to switch from executing command stream 36A to executing command stream 36D.

If GPU 12 fails to interrupt execution of command stream 36A within an elapsed time period after issuing preemption command 40E, GPU 12 may attempt to once again preempt processing units 34's execution of command stream 36A by issuing a subsequent preemption command at a relatively finer preemption granularity than preemption command 40E.

In one example, GPU 12 may issue preemption command 40F as a workgroup level preemption command 40F to preempt after processing the current workgroup of the kernels that are currently being processed by processing units 34. In response to receiving the workgroup level preemption command, processing units 34 may continue to execute the commands of the currently-executing workgroup until it has finished executing each kernel of the workgroup. For example, if four shader processors (or other compute units) of processing units 34 are executing four kernels making up a workgroup, each of the four shader processors may complete execution of its respective kernel of the workgroup before processing units 34 reaches the workgroup level boundary associated with command stream 36D. Upon reaching the workgroup level boundary, processing units 34 may stop execution of command stream 36A and may perform a context switch to switch from executing command stream 36A to executing command stream 36D.

If GPU 12 fails to interrupt execution of command stream 36A within an elapsed time period after issuing preemption command 40F, GPU 12 may attempt to once again preempt processing units 34's execution of command stream 36A by issuing a subsequent preemption command at a relatively finer preemption granularity than preemption command 40F.

For example, if, three of the four shader processors of processing units 34 has finished execution of their respective threads of the workgroup, but the remaining shader processor is still in the process of executing the remaining thread of the workgroup, GPU 12 may issue a subsequent preemption command (not shown) as an instruction level preemption command that sets an instruction level boundary immediately after the currently executing instruction on the remaining active shader processor of processing units 34.

Once the remaining shader processor has finished processing the current instruction of the thread and reaches the instruction level boundary associated with the preemption command, GPU 12 may perform a context switch to switch from executing command stream 36A to executing command stream 36D.

As can be seen, a kernel level preemption command may be associated with a kernel level boundary, a workgroup level preemption command may be associated with a workgroup level boundary, and an instruction level preemption command may be associated with an instruction level boundary. Workgroup level preemption commands and instruction level preemption commands may be considered sub-kernel level preemption commands with sub-kernel level preemption boundaries because they may be finer-grained preemption commands than a kernel level preemption command. Further, while a workgroup level preemption command may be a finer-grained preemption command than a kernel level preemption command, an instruction level preemption command may be a finer-grained preemption command than a workgroup level preemption command. In addition, in some examples, GPU 12 may issue an instruction level preemption command directly after issuing a kernel level preemption command without necessarily issuing an intervening workgroup level preemption command.

Upon processing units 34 finishing execution of command stream 36D, GPU 12 may perform a context switch to restart execution of command stream 36A if there are no other pending command streams with a higher priority than command stream 36A that are ready for execution by GPU 12. GPU 12 may restart execution of command stream 36A starting from the same point at which it last stopped execution of command stream 36A.

As can be seen from the examples shown in FIG. 3, GPU 12 may adaptively issue multiple preemption commands of varying granularities in response to receiving a notification that a higher priority command stream is ready to execute on GPU 12. GPU 12 may initially issue a preemption command with a relatively coarse-grained granularity, and may, as the scheduling deadline of the higher priority command stream approaches, issue successive finer-grained preemption commands, to ensure that GPU 12 is able to finish executing the higher priority command stream by its scheduling deadline.

In some examples, GPU 12 may preempt different parts of a graphics processing pipeline executing on GPU 12 at varied preemption granularities. To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

Figure 4:
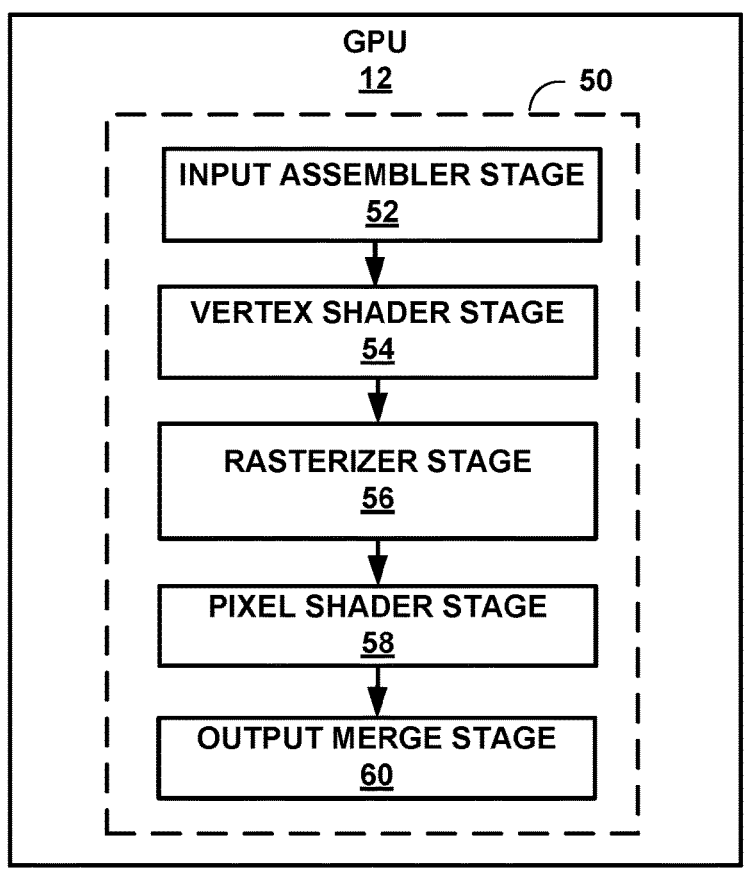
FIG. 4 is a block diagram illustrating an exemplary graphics processing pipeline that may execute on the GPU.

FIG. 4 is a block diagram illustrating an exemplary graphics processing pipeline that may execute on GPU 12. As shown in FIG. 4, graphics processing pipeline 50 may include one or more of input assembler stage 52, vertex shader stage 54, rasterizer stage 56, pixel shader stage 58, and output merge stage 60. GPU 12 may include addition stages such a hull shader stage, tessellation stage, domain shader stage that following the vertex shader stage in that order. GPU 12 may also include a geometry shader stage that is coupled to the output to domain shader stage, if GPU includes a domain shader stage, or the output of the vertex shader stage 54, if no domain shader stage. Rasterizer stage 56 may receive graphics data from vertex shader stage 54, as illustrated, or from geometry shader stage (when available) or domain shader stage (when available).

Other configurations of graphics processing pipeline 50 are possible, and the techniques descried in this disclosure should not be considered limited to the specific example illustrated in FIG. 4. For example, GPU 12 may include more stages than those illustrated, and in some examples, GPU 12 may not necessarily include all of the illustrated stages. Also, the specific ordering of the stages is provided for purposes of illustration and should not be considered limiting.

Input assembler stage 52 may read vertex points of vertices from system memory 10 as defined by CPU 6, and assemble the control points to form the vertices. For instance, input assembler stage 52 may read the coordinates, color values, and other such information. The coordinates, color values, and other such information may be commonly referred to as attributes of the vertices. Based on the attributes of the vertices, input assembler stage 52 may determine the general layout of the primitives. In this manner, input assembler stage 52 may assemble the control points to form the patch. Input assembler stage 52 may be a fixed-function unit.

Vertex shader stage 54 may process the vertices from input assembler stage 52. For example, vertex shader stage 54 may perform per-vertex operations such as transformations, skinning, morphing, and per-vertex lighting. Vertex shader stage 54 may be a shader.

Rasterizer stage 56 receives the primitives from the geometry shader stage and converts the primitives into pixels for the display. For example, the primitives may be defined as vectors that indicate the interconnection of the primitives, and may be defined in a coordinate space that is independent of the display on which the image is to be displayed. Rasterizer stage 56 converts these vectors into the display coordinates, and performs any additional functions such as removing points within primitives that are occluded.

Pixel shader stage 58 receives the pixels as outputted by rasterizer stage 56 and performs post processing to assign color values to each of the pixels that are to be displayed. For example, pixel shader stage 58 may receive constant values stored in system memory 10, texture data stored in system memory 10, and any other data to generate per-pixel outputs such as color values. Pixel shader stage 58 may also output opacity values that indicate the opaqueness of the pixels.

Output merge stage 60 may perform any final pixel processing. For example, output merge stage 60 may utilize depth information to further determine whether any of the pixels should be removed from being displayed. Output merge stage 60 may also perform blending operations to generate final pixel values. Output merge stage 60 may output the final pixel values to a frame buffer, generally located within system memory 10, but which may be located within GPU 12.

In some aspects of the present disclosure, GPU 12 may issue preemption commands in which different parts of graphics processing pipeline 50 are preempted at different preemption granularities. Preempting different parts of graphics processing pipeline 50 may include preempting one part of graphics processing pipeline 50 at one preemption boundary while preempting other parts of graphics processing pipeline 50 at another preemption boundary.

In the example of a draw call that draws a plurality of primitives, pixel shader stage 58 may, in some instances, take longer to process a set of primitives than vertex shader stage 54. Thus, GPU 12 may issue a preemption command such that the graphics processing pipeline up to vertex shader stage 54 are preempted at a draw call level granularity while pixel shader stage 58 is preempted at a sub-draw call level granularity. Thus, while the graphics processing pipeline, through vertex shader stage 54, may process each of the primitive to be drawn by a draw call, pixel shader stage 58 may process only a subset (i.e., fewer than all) of those primitives drawn by a draw call. GPU 12 may store the remaining primitives that are not processed by pixel shader stage 58 in memory, such as system memory 10, or in a cache in GPU 12.

Subsequent to issuing a preemption command that preempts graphics processing pipeline 50 up to vertex shader stage 54 at a draw call level and preempts pixel shader stage 58 at a sub-draw call level, GPU 12 may issue another preemption command that further preempts the two parts of graphics processing pipeline 50 at a finer preemption granularity. For example, GPU 12 may preempt graphics processing pipeline 50 up to vertex shader stage 54 at a sub-draw call level and may further preempt pixel shader stage 58 at an instruction level. By preempting different portions of graphics processing pipeline 50 at different preemption granularities, GPU 12 may enable its processing units 34 to better respond to preemption commands and to be able to more efficiently switch contexts to process other, higher priority command streams.

Figure 5:
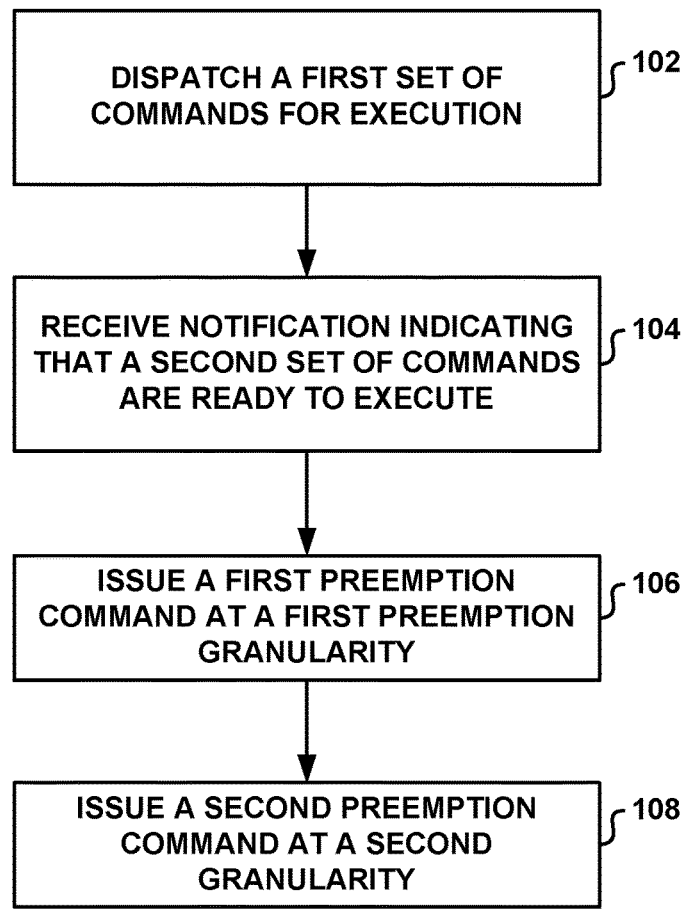
FIG. 5 is a flow diagram illustrating an example technique for handling preemption notifications when processing command streams according to the technique disclosed herein.

FIG. 5 is a flow diagram illustrating an example technique for handling preemption notifications when processing command streams according to the technique disclosed herein. As shown in FIG. 5, GPU 12 may dispatch one or more commands of a first set of commands for execution on one or more processing units of the GPU (102). For example, the first set of commands may be in the form of a command stream, such as command stream 32A. The first set of commands may be a set of graphics commands (e.g., draw calls) or may be a set of compute commands (e.g., general-purpose computing operations that are not limited to graphics operations).

GPU 12 may receive and/or detects a preemption notification from a host device, such as CPU 6, indicating that a second set of commands are ready to execute on GPU 12 (104). The second set of commands may be a set of graphics commands (e.g., draw calls) or may be a set of compute commands (e.g., general-purpose computing operations that are not limited to graphics operations). The first and second sets of commands may be the same type or different types of commands in that the first set of commands may be a set of graphics commands while the second set of commands may be a set of compute commands. Conversely, the first set of commands may be a set of compute commands while the second set of commands may be graphics commands. GPU 12 may, in response to receiving the notification, issue a first preemption command at a first preemption granularity to the one or more processing units of GPU 12 (106). In the context of GPU 12 executing commands for rendering one or more primitives making up an image, the first preemption granularity may be a draw call level preemption granularity, a sub-draw call level preemption granularity (e.g., primitive level preemption granularity or pixel tile level preemption granularity), or an instruction level preemption granularity. In additional contexts, the first preemption granularity may be a kernel level preemption granularity or a workgroup level preemption granularity.

GPU 12 may, in response to GPU 12 failing to preempt execution of the first set of commands within an elapsed time period after issuing the first preemption command, dynamically issue a second preemption command at a second preemption granularity to the one or more processing units of the GPU, wherein the second preemption granularity is finer-grained than the first preemption granularity (108). For example, if the first preemption command was at a draw call level granularity, the second preemption command may be at a sub-draw call level granularity (e.g., primitive level preemption granularity or pixel tile level preemption granularity) or an instruction level granularity. Such an issuance of the second preemption command at the second preemption granularity may be transparent to the host device, such as CPU 6, such that CPU 6 does not receive any indications that GPU 12 has issued the second preemption command.

In some examples, the first preemption granularity is associated with a first preemption boundary at which the one or more processing units stop execution of the first set of commands, the second preemption granularity is associated with a second preemption boundary at which the one or more processing units stop execution of the first set of commands, and the second preemption boundary indicates an earlier point at which to interrupt execution than the first preemption boundary.

For example, given a draw call in a command stream that is being processed, the earlier point indicated by the second preemption boundary may be a sub-draw call boundary that is not directly in the command stream. Rather, as discussed above, because GPU 12 executes a plurality of sub-draw calls in order to perform graphics rendering according to the draw call, the earlier point may be a sub-draw call boundary of the plurality of sub-draw calls where GPU 12 may interrupt processing of the draw call.

Similarly, given a compute command in a command stream that is being processed, where the compute command is a kernel that is executed in parallel by GPU 12, the earlier point indicated by the second preemption boundary may be a sub-kernel boundary that is not directly in the command stream. Rather, the earlier point may be a sub-kernel boundary where GPU 12 may interrupt processing of the kernel.

Thus, if the first preemption command is a draw call level granularity, then the first preemption boundary comprises a draw call level boundary. Similarly, if the second preemption command is a sub-draw call level preemption command, then the second preemption boundary comprises one of: a primitive level boundary, a pixel tile level boundary, and an instruction level boundary.

Further, if the first preemption command is a kernel level granularity, then the first preemption boundary comprises a kernel level boundary. Similarly, if the second preemption command is a sub-kernel level preemption command, then the second preemption boundary comprises one of: a workgroup level boundary and an instruction level boundary.

GPU 12 may, in response to its one or more processing units reaching a point in the first set of commands indicated by the second preemption boundary, perform a context switch to the second set of commands by saving a state of the GPU associated with execution of the first set of commands and dispatch one or more of the second set of commands for execution on the one or more processing units of GPU 12.

In some examples, GPU 12 may determine a scheduling deadline for executing the second set of commands. For example, CPU 6, GPU driver 28, or display interface 16 may provide an indication of the scheduling deadline associated with the set of commands. If the second set of commands comprises draw calls for drawing an image to be displayed by display 18, the associated scheduling deadline for the second set of commands may be based at least in part on the time at which the next vertical synchronization of display 18 occurs. Thus, in one example, the scheduling deadline comprises a time of a next vertical synchronization of a display device that displays an image resulting from execution of the second set of commands. In other examples, the associated scheduling deadline for the second set of commands may be based at least in part on the frame rate requirements for displaying images drawn by the second set of commands, or any other suitable scheduling deadlines.

GPU 12 may dynamically determine the second preemption granularity at which to issue the second preemption command based at least in part on the scheduling deadline. For example, if GPU 12 determines that the scheduling deadline is relatively close, GPU 12 may choose to issue a relatively fine-grained preemption command, such as an instruction level preemption command, to processing units 34 in lieu of a relatively coarser-grained preemption command, such as a sub-draw call level command.

In some examples, in response to the one or more processing units 34 of GPU 12 failing to preempt execution of the first set of commands within a second elapsed time period after GPU 12 issues the second preemption command, GPU 12 may issue a third preemption command at a third preemption granularity to the one or more processing units 34 of GPU 12, wherein the third preemption granularity is associated with a third preemption boundary at which the one or more processing units 34 stop execution of the first set of commands, and wherein the third preemption boundary indicates an earlier point in the set of commands at which to interrupt execution than the first preemption boundary or the second preemption boundary. In this example, the first preemption boundary may be a draw call level boundary, the second preemption boundary may be a first sub-draw call level boundary, and the third preemption boundary may be a second sub-draw call level boundary.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
dispatching, by a graphics processing unit (GPU), one or more commands of a first set of commands for execution on one or more processing units of the GPU;
receiving, by the GPU, a notification from a host device indicating that a second set of commands are ready to execute on the GPU;
in response to receiving the notification, issuing, by the GPU, a first preemption command at a first preemption granularity to the one or more processing units of the GPU, wherein the first preemption granularity is associated with a first preemption boundary within the first set of commands at which the one or more processing units stop execution of the first set of commands; and
in response to the one or more processing units of the GPU failing to preempt execution of the first set of commands within an elapsed time period after the GPU issues the first preemption command, wherein the elapsed time period is associated with an estimated time for the GPU to reach the first preemption boundary within the first set of commands, and wherein the GPU failed to complete execution of commands of the first set of commands up to the first preemption boundary within the estimated time, issuing, by the GPU, a second preemption command at a second preemption granularity to the one or more processing units of the GPU, wherein the second preemption granularity is associated with a second preemption boundary within the first set of commands at which the one or more processing units stop execution of the first set of commands, and wherein the second preemption boundary indicates an earlier point within the first set of commands at which to interrupt execution than the first preemption boundary.

2. The method of claim 1, wherein:
the first preemption boundary comprises a draw call level boundary; and
the second preemption boundary comprises one of: a primitive level boundary, a pixel tile level boundary, and an instruction level boundary.

3. The method of claim 1, wherein:
the first preemption boundary comprises a kernel level boundary; and the second preemption boundary comprises one of a workgroup level boundary and an instruction level boundary.

4. The method of claim 1, further comprising:
in response to the one or more processing units of the GPU reaching a point in the first set of commands indicated by the second preemption boundary,
saving, by the GPU, a state of the GPU associated with execution of the first set of commands, and
dispatching, by the GPU, one or more commands of the second set of commands for execution on the one or more processing units of the GPU.

5. The method of claim 1, further comprising:
determining, by the GPU, a scheduling deadline for executing the second set of commands; and
determining, by the GPU, the second preemption granularity of the second preemption command based at least in part on the scheduling deadline.

6. The method of claim 5, wherein:
the scheduling deadline is based at least in part on a time of a next vertical synchronization of a display device that displays an image resulting from execution of the second set of commands.

7. The method of claim 1, further comprising:
in response to the one or more processing units of the GPU failing to preempt execution of the first set of commands within a second elapsed time period after the GPU issues the second preemption command, issuing, by the GPU, a third preemption command at a third preemption granularity to the one or more processing units of the GPU, wherein the third preemption granularity is associated with a third preemption boundary within the first set of commands at which the one or more processing units stop execution of the first set of commands, and wherein the third preemption boundary indicates an earlier point within the first set of commands at which to interrupt execution than the first preemption boundary or the second preemption boundary.

8. The method of claim 1, wherein the issuance of the second preemption command at the second preemption granularity to the one or more processing units of the GPU is transparent to the host device.

9. The method of claim 1, wherein:
the first set of command comprises a set of graphics commands; and
the second set of commands comprises a set of compute commands.

10. A computing device comprising:
a memory configured to store a first set of commands and a second set of commands; and
at least one processor configured to:
dispatch one or more commands of the first set of commands for execution on one or more processing units of the at least one processor;
receive a notification from a host device indicating that the second set of commands are ready to execute on the at least one processor;
in response to receiving the notification, issue a first preemption command at a first preemption granularity to the one or more processing units of the at least one processor, wherein the first preemption granularity is associated with a first preemption boundary within the first set of commands at which the one or more processing units stop execution of the first set of commands; and in response to the one or more processing units of the at least one processor failing to preempt execution of the first set of commands within an elapsed time period after the at least one processor issues the first preemption command, wherein the elapsed time period is associated with an estimated time for the GPU to reach the first preemption boundary within the first set of commands, and wherein the GPU failed to complete execution of commands of the first set of commands up to the first preemption boundary within the estimated time, issue a second preemption command at a second preemption granularity to the one or more processing units of the at least one processor, wherein the second preemption granularity is associated with a second preemption boundary within the first set of commands at which the one or more processing units stop execution of the first set of commands, and wherein the second preemption boundary indicates an earlier point within the first set of commands at which to interrupt execution than the first preemption boundary.

11. The computing device of claim 10, wherein:
the first preemption boundary comprises a draw call level boundary; and
the second preemption boundary comprises one of: a primitive level boundary, a pixel tile level boundary, and an instruction level boundary.

12. The computing device of claim 10, wherein:
the first preemption boundary comprises a kernel level boundary; and
the second preemption boundary comprises one of a workgroup level boundary and an instruction level boundary.

13. The computing device of claim 10, wherein the at least one processor is further configured to:
in response to the one or more processing units of the at least one processor reaching a point in the first set of commands indicated by the second preemption boundary,
save a state of the at least one processor associated with execution of the first set of commands, and
dispatch one or more commands of the second set of commands for execution on the one or more processing units of the at least one processor.

14. The computing device of claim 10, wherein the at least one processor is further configured to:
determine a scheduling deadline for executing the second set of commands; and
determine the second preemption granularity of the second preemption command based at least in part on the scheduling deadline.

15. The computing device of claim 14, wherein:
the scheduling deadline is based at least in part on a time of a next vertical synchronization of a display device that displays an image resulting from execution of the second set of commands.

16. The computing device of claim 10, wherein the at least one processor is further configured to:
in response to the one or more processing units of the at least one processor failing to preempt execution of the first set of commands within a second elapsed time period after the at least one processor issues the second preemption command, issue a third preemption command at a third preemption granularity to the one or more processing units of the at least one processor, wherein the third preemption granularity is associated with a third preemption boundary within the first set of commands at which the one or more processing units stop execution of the first set of commands, and wherein the third preemption boundary indicates an earlier point within the first set of commands at which to interrupt execution than the first preemption boundary or the second preemption boundary.

17. The computing device of claim 10, wherein the issuance of the second preemption command at the second preemption granularity to the one or more processing units of the GPU is transparent to the host device.

18. The computing device of claim 10, wherein:
the first set of command comprises a set of graphics commands; and
the second set of commands comprises a set of compute commands.

19. An apparatus comprising:
means for dispatching one or more commands of a first set of commands for execution on one or more processing units;
means for receiving a notification from a host device indicating that a second set of commands are ready to execute, wherein the second set of commands have a scheduling priority that is greater than a scheduling priority of the first set of commands;
means for, in response to receiving the notification, issuing a first preemption command at a first preemption granularity to the one or more processing units, wherein the first preemption granularity is associated with a first preemption boundary within the first set of commands at which the one or more processing units stop execution of the first set of commands; and
in response to the one or more processing units failing to preempt execution of the first set of commands within an elapsed time period after issuance the first preemption command, wherein the elapsed time period is associated with an estimated time for the GPU to reach the first preemption boundary within the first set of commands, and wherein the GPU failed to complete execution of commands of the first set of commands up to the first preemption boundary within the estimated time, means for issuing a second preemption command at a second preemption granularity to the one or more processing units, wherein the second preemption granularity is associated with a second preemption boundary within the first set of commands at which the one or more processing units stop execution of the first set of commands, and wherein the second preemption boundary indicates an earlier point within the first set of commands at which to interrupt execution than the first preemption boundary.

20. The apparatus of claim 19, wherein:
the first preemption boundary comprises a draw call level boundary; and
the second preemption boundary comprises one of: a primitive level boundary, a pixel tile level boundary, and an instruction level boundary.

21. The apparatus of claim 19, wherein:
the first preemption boundary comprises a kernel level boundary; and
one of a workgroup level boundary and an instruction level boundary.

22. The apparatus of claim 19, further comprising:
means for, in response to the one or more processing units reaching a point in the first set of commands indicated by the second preemption boundary,
saving a state associated with execution of the first set of commands, and
dispatching one or more commands of the second set of commands for execution on the one or more processing units.

23. The apparatus of claim 19, further comprising:
means for determining a scheduling deadline for executing the second set of commands; and
means for determining the second preemption granularity of the second preemption command based at least in part on the scheduling deadline.

24. The apparatus of claim 23, wherein:
the scheduling deadline is based at least in part on a frame rate requirement of a display device that displays an image resulting from execution of the second set of commands.

25. A non-transitory computer readable storage medium comprising instructions that upon execution by one or more processors cause the one or more processors to:
dispatch one or more commands of a first set of commands for execution on one or more processing units of the one or more processors;
receive a notification from a host device indicating that a second set of commands are ready to execute on the one or more processors;
in response to receiving the notification, issue a first preemption command at a first preemption granularity to the one or more processing units of the one or more processors, wherein the first preemption granularity is associated with a first preemption boundary within the first set of commands at which the one or more processing units stop execution of the first set of commands; and
in response to the one or more processing units of the one or more processors failing to preempt execution of the first set of commands within an elapsed time period after the one or more processors issues the first preemption command, wherein the elapsed time period is associated with an estimated time for the GPU to reach the first preemption boundary within the first set of commands, and wherein the GPU failed to complete execution of commands of the first set of commands up to the first preemption boundary within the estimated time, issue a second preemption command at a second preemption granularity to the one or more processing units of the one or more processors, wherein the second preemption granularity is associated with a second preemption boundary within the first set of commands at which the one or more processing units stop execution of the first set of commands, and wherein the second preemption boundary indicates an earlier point within the first set of commands at which to interrupt execution than the first preemption boundary.

26. The non-transitory computer readable storage medium of claim 25, wherein:
the first preemption boundary comprises a draw call level boundary; and
the second preemption boundary comprises one of: a primitive level boundary, a pixel tile level boundary, and an instruction level boundary.

27. The non-transitory computer readable storage medium of claim 25, wherein:
the first preemption boundary comprises a kernel level boundary; and
the second preemption boundary comprises one of a workgroup level boundary and an instruction level boundary.

28. The non-transitory computer readable storage medium of claim 25, wherein the instructions, upon execution by the one or more processors, further cause the one or more processors to:
- in response to the one or more processing units of the one or more processors reaching a point in the first set of commands indicated by the second preemption boundary,
- save a state of the one or more processors associated with execution of the first set of commands, and
- dispatch one or more commands of the second set of commands for execution on the one or more processing units of the one or more processors.

29. The non-transitory computer readable storage medium of claim 25, wherein the instructions, upon execution by the one or more processors, further cause the one or more processors to:
- determine a scheduling deadline for executing the second set of commands; and
- determine the second preemption granularity of the second preemption command based at least in part on the scheduling deadline.

30. The non-transitory computer readable storage medium of claim 28, wherein:
- the scheduling deadline is based at least in part on a time of a next vertical synchronization of a display device that displays an image resulting from execution of the second set of commands.

* * * * *